US008699242B2

(12) United States Patent
Archer

(10) Patent No.: US 8,699,242 B2
(45) Date of Patent: Apr. 15, 2014

(54) SYNCHRONOUS DRIVE CIRCUIT FOR VARIABLE FREQUENCY RESONANT CONVERTERS

(75) Inventor: Michael Archer, Moorpark, CA (US)

(73) Assignee: Convergent Capital Partners II, L.P., Minneapolis, MN (US)

(*) Notice: Subject to any disclaimer, the term of this patent is extended or adjusted under 35 U.S.C. 154(b) by 142 days.

(21) Appl. No.: 13/098,331

(22) Filed: Apr. 29, 2011

(65) Prior Publication Data
US 2011/0267842 A1     Nov. 3, 2011

Related U.S. Application Data

(60) Provisional application No. 61/329,383, filed on Apr. 29, 2010.

(51) Int. Cl.
*H02M 3/335*     (2006.01)
(52) U.S. Cl.
USPC ................................. 363/21.14; 363/21.06

(58) Field of Classification Search
USPC ................................. 363/21.08–21.18, 21.06
See application file for complete search history.

(56) References Cited

U.S. PATENT DOCUMENTS

| 6,353,544 | B1 * | 3/2002 | Lau | 363/21.14 |
| 6,400,583 | B1 * | 6/2002 | Lau | 363/21.14 |
| 6,961,256 | B2 * | 11/2005 | Yang | 363/21.06 |
| 2004/0125621 | A1 * | 7/2004 | Yang et al. | 363/21.14 |
| 2007/0103946 | A1 * | 5/2007 | Kyono | 363/21.14 |

\* cited by examiner

*Primary Examiner* — Jue Zhang
(74) *Attorney, Agent, or Firm* — Cislo & Thomas, LLP

(57) ABSTRACT

A DC to DC converter for controlling the on time and off time of a pair of synchronous switches, which reside in the position of output rectifiers in a half bridge transformer type circuit is provided. The circuit is actually two identical circuits, one for each half of the transformer output. The circuits consist of a voltage reference, a dual comparator, a bias switch, and drive buffer as well as biasing means for proper set up of the various parameters.

18 Claims, 5 Drawing Sheets

SYNCHRONOUS DRIVE CIRCUIT FOR VARIABLE FREQUENCY RESONANT CONVERTERS

CROSS REFERENCE TO RELATED APPLICATIONS

This application claims the benefit of U.S. Provisional Application Ser. No. 61/329,383 filed by Michael Archer on Apr. 29, 2010.

FIELD OF THE INVENTION

This invention relates to the use of a synchronous Field Effect Transistor for rectifying the output of a resonant DC to DC converter which is operating in variable frequency mode. The converter produces a regulated DC voltage.

BACKGROUND OF THE INVENTION

Efficient use of electricity is paramount to society today due to demand that continues to increase through the electrification of the world at a pace that is outstripping the ability of the planet to generate the required energy. To combat this, regulations have been introduced to improve the efficiency of power supplies used to convert AC voltages to the DC voltages used by today's sophisticated electronic equipment.

Electronic devices are typically supplied with power from a power supply that converts AC line power to a DC voltage. However, various components in the electronic devices may require different DC voltages from that supplied by the power supply. In addition, some of these components require a highly regulated voltage to operate properly. DC to DC converters are used to convert the output of the power supply to a different regulated voltage.

Examples of electronic devices which typically use DC to DC converters are computers, servers, radios and like equipment. For example, in a computer the power supply unit may produce one voltage, for example, 10 volts, for components such as disc drives while another lower voltage, such 3 or less volts, is needed to supply processors and memory chips. In the case of computers, it is important that these lower voltage levels be maintained as precisely as possible since the logic circuitry depends upon voltage levels for accuracy. This is true even when high current demands are being placed upon the main power supply for instance during startup or whenever disc drives spin up from sleep mode and impose transient draws upon the power supply.

First generation resonant converters have successfully been used to meet the energy star requirements above in the high volume desktop and notebook computer fields. These first generation converters utilize fixed frequency resonant DC-to-DC stages to efficiently convert power to the load, but require an amplitude modulation stage to remove ripple and tighten the load regulation. These extra circuits add cost and size to the assembly. Since the power factor of the AC input waveforms must also meet stringent standards, the prior art converter has the burden of having three stages to complete the transfer of energy from an AC line to the end DC load; A power factor stage in the front, an amplitude modulation stage second and a final fixed frequency DC to DC converter for the main step down of voltage.

It is, therefore, one of the primary objects of the present invention to remove the second amplitude modulation stage of the current high volume resonant mode power supplies and frequency modulate the resonant converter while still being able to operate the resonant mode converter with synchronous power field effect transistors ("FETS") for optimum efficiency.

SUMMARY OF THE INVENTION

The present invention provides a DC to DC converter electrical circuit arrangement for controlling the on time and off time of a pair of synchronous switches, which reside in the position of output rectifiers in a half bridge transformer type circuit. The circuit is actually two identical circuits, one for each half of the transformer output. The circuits consist of a voltage reference, a dual comparator, a bias switch, and drive buffer as well as biasing means for proper set up of the various parameters.

Depending on the condition of the load, the power supply feedback will respond by adjusting the on time of the primary to increase or decrease the available power. It does this via a frequency modulated half bridge driver integrated circuit ("IC") on the primary set up to respond to a feedback error signal from the secondary. As the need for power increases, the frequency of the converter is decreased, moving the operating frequency closer to the resonant frequency of the transformer, which is set to resonate with a resonant capacitor and the leakage inductance of the said transformer. Maximum power is obtained when the frequency of the power supply is the same as the resonant frequency of the transformer LC network. Once this point is reached, the power available to the load will drop. Increasing frequency will lower available power as the converter slides up the impedance curve of the resonant transformer.

Since this action makes the on time change from the max time on ("$T_{on}$") associated with full resonance to a small $T_{on}$ associated with the maximum frequency, the prior art way of setting a fixed time for the resonant circuit will no longer work. If the on time is not adjusted to the output synchronous FETS, the converter will fail due to cross conduction and reverse current flow through these FETS.

In order to prevent this, the on time for the FETS needs to be adjusted in response to the operating frequency. To accomplish this, the new circuit uses the frequency of the converter to generate an error signal. An RC circuit is used followed by a peak charge circuit to generate this error signal. The signal for this circuit is derived from the secondary winding directly, eliminating the need to cross the load line barrier.

The main comparator is comparing a ramp generated by the converter at every cycle to the error signal, which has a maximum voltage clamp on to set the maximum on time of the synchronous FETS. In this way, the intersection of the ramp and the error signal will change with the frequency setting an adjusted on time to the FETS that corresponds to a safe conduction angle for each power.

DETAILED DESCRIPTION OF THE PREFERRED EMBODIMENT

The present invention will now be described more fully hereinafter with reference to the accompanying drawings, in which a preferred embodiment of the invention is shown. The invention may, however, be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

Figure 1:
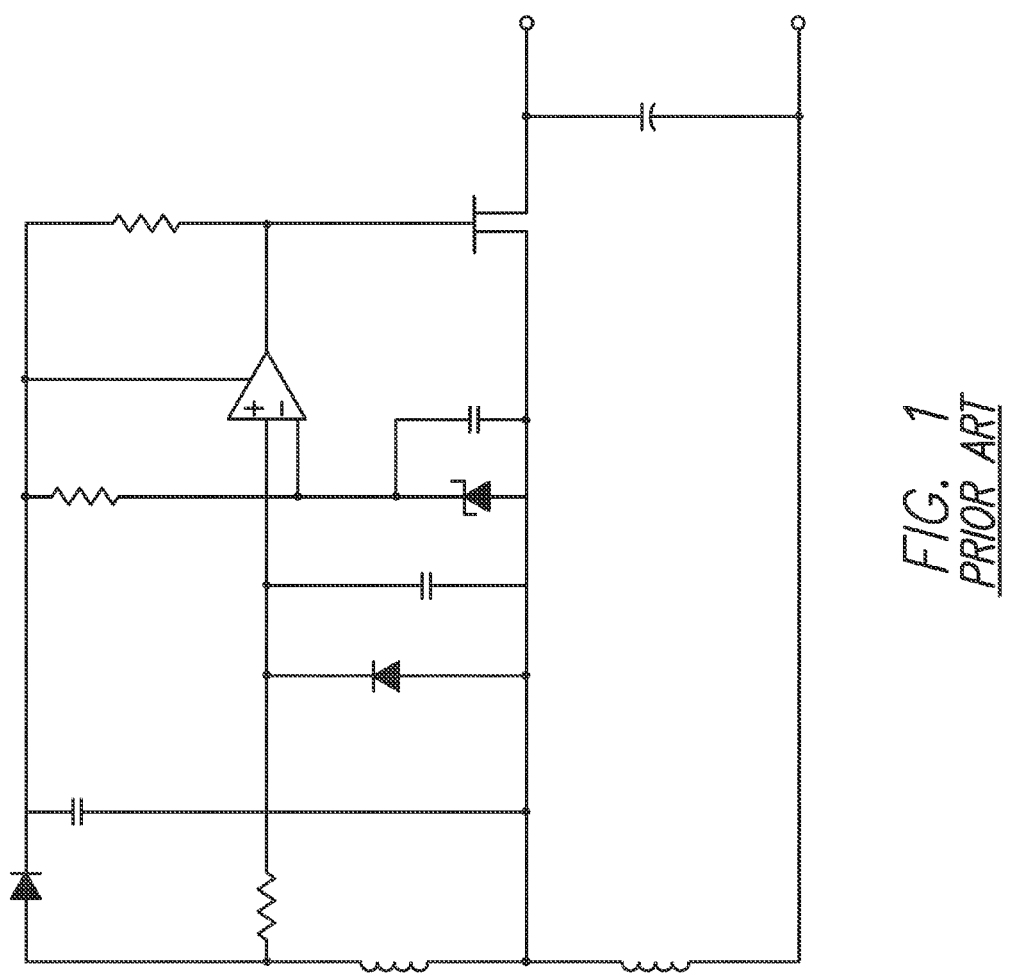
FIG. 1 is a schematic showing the prior art.
Figure 2:
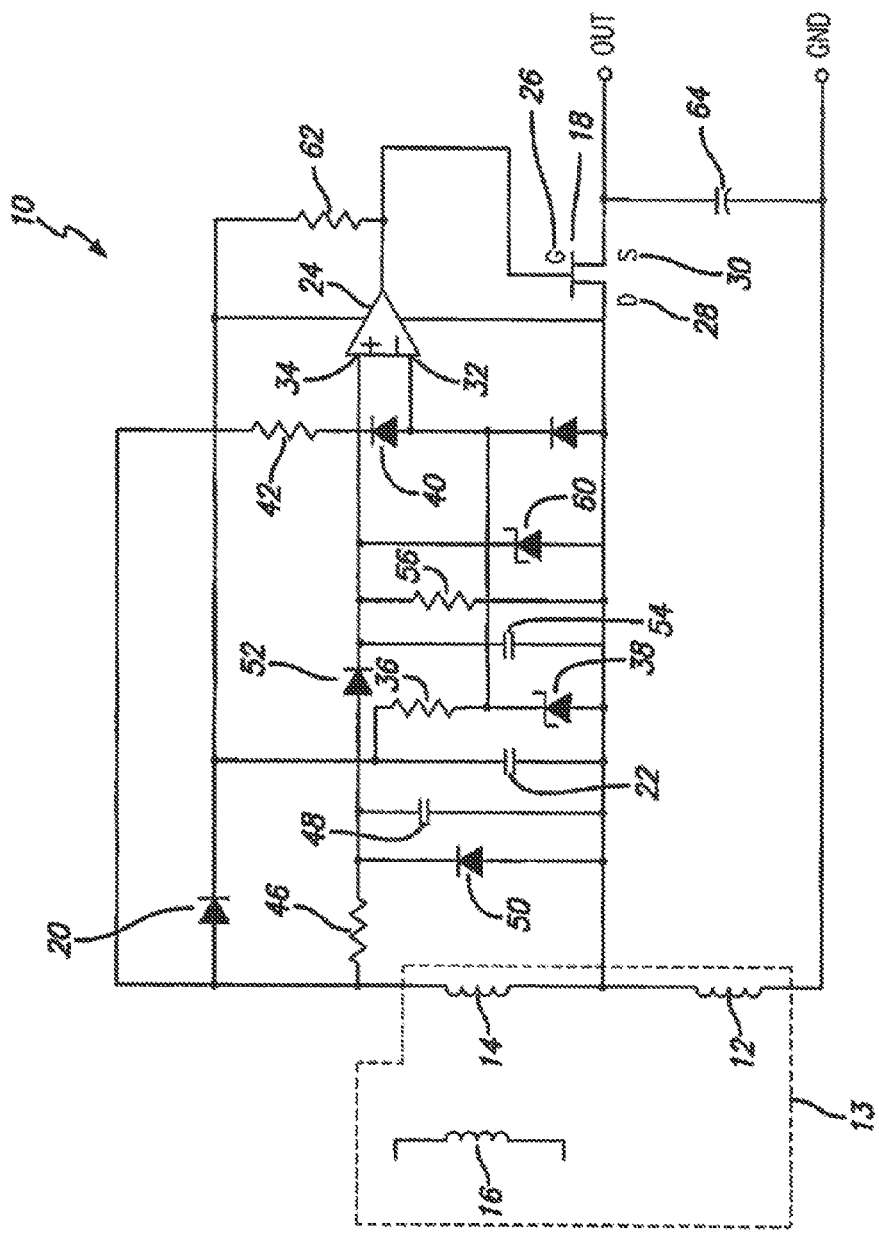
FIG. 2 is a schematic showing the preferred embodiment of the present invention.
Figure 3:
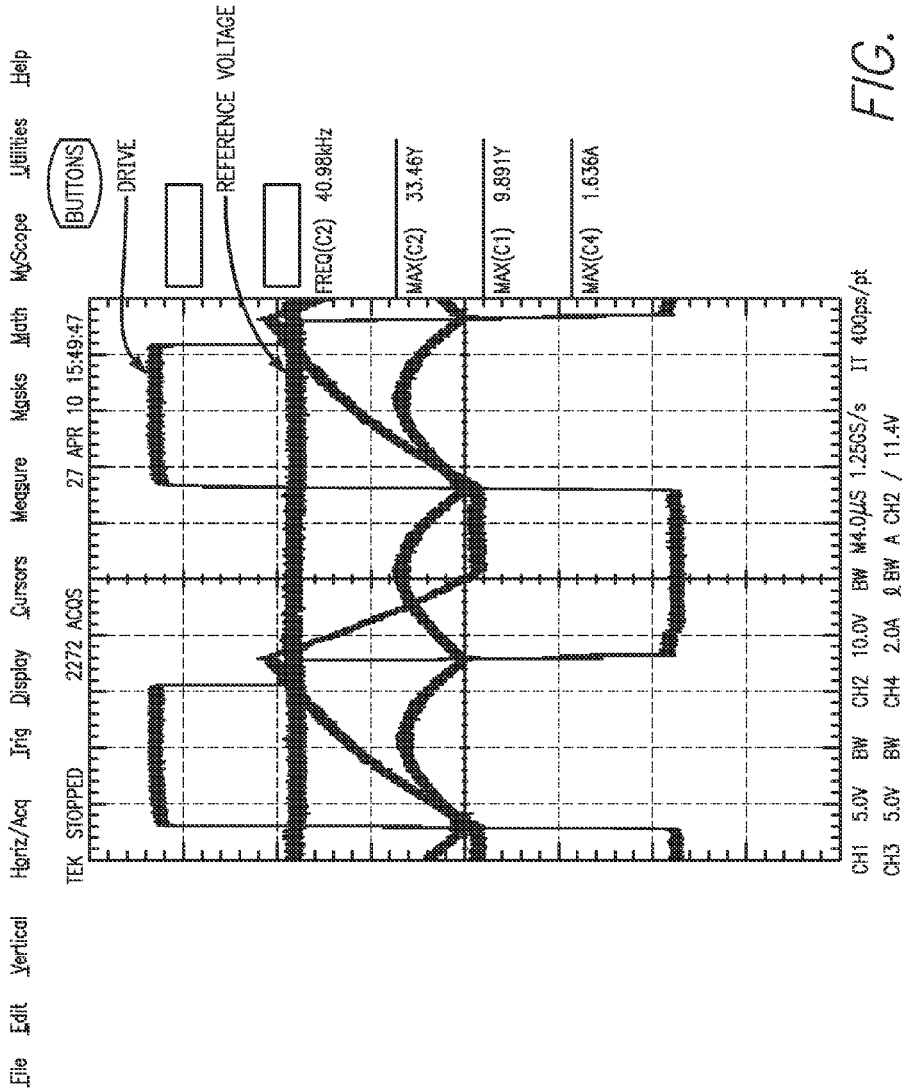
FIG. 3 is a drawing showing the maximum power on time and current in the resonant synchronous switch.
Figure 4:
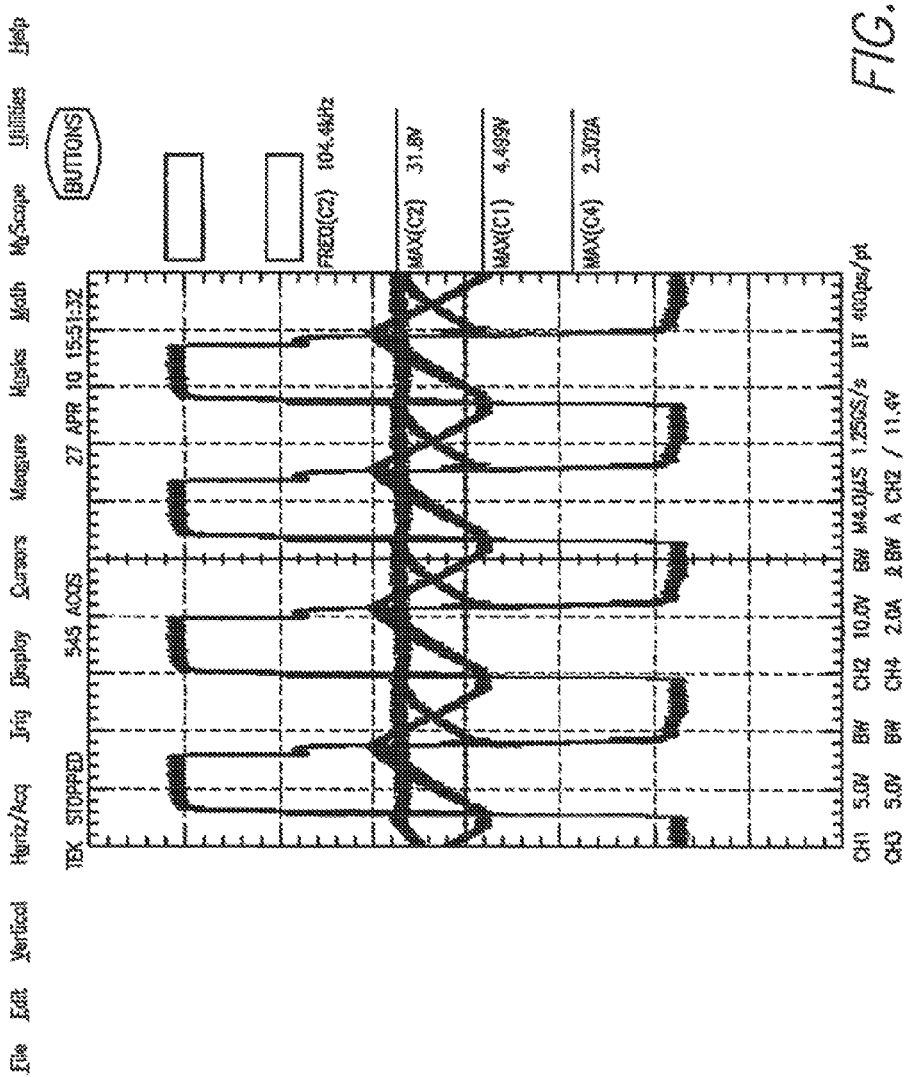
FIG. 4 is the a drawing showing the minimum on time and current in the resonant synchronous switch.

FIG. 2 details the preferred embodiment of the present invention synchronous DC to DC converter 10. For the sake of simplicity, only one half of the half bridge converter is shown. In reality, there are two mirror image circuits in the preferred embodiment with each half operating on its respective cycle in the half bridge converter.

With reference to FIG. 2, transformer windings 12 and 14 refer to one half of the four windings making up the secondary winding for any synchronously driven output on the transformer 13. Winding 12 is the power winding, supplying the high current necessary for regulation of the power to the end load. Winding 14 is a low current winding stacked on top of the power winding 12 supplying both bias for the logic circuit and the necessary information for control of a first control switch or synchronous FET 18. Winding 16 refers to the primary winding of the transformer.

When the windings are in phase with the appropriate primary switch such that the voltage across winding 12 is positive, then the voltage at the start of winding 14 will be more positive than that at the start of winding 12. This additional voltage supplies the DC operating bias for the circuit driving the FET 18 via diode 20 and capacitor 22 which serve as a rectifier and filter for the bias supply. This bias supply will be approximately 10 Volts higher than the regulation voltage at the source of the FET 18 and thus sufficient to bias a second switch or comparator 24 and supply adequate gate drive to the gate 26 of FET 18 when the comparator 24 state is ON.

The negative pin 32 of the comparator 24 is fed a reference voltage, which is derived from the bias of resistor 36 and reference zener diode 38. This reference is available whenever the windings 12 and 14 are positively biased with respect to the source 30 of FET 18. The voltage on the negative pin 32 of the comparator 24 is reset via diode 40 and resistor 42 every time the voltage on the transformer reverses direction to forward bias the other half of the transformer and its identical circuit to drive the other synchronous switch.

The positive pin 34 of the comparator 24 is fed a voltage that is a function of the frequency of the converter at any given time. This action is generated by the peak charge circuit 44 made up of resistor 46, capacitor 48, diode 50, diode 52, capacitor 54, resistor 56 and zener diode 60. When the voltage across the windings 12 and 14 is positive with respect to the source 30 of FET 18, a peak voltage is generated via the RC time constant of resistor 46 and capacitor 48. Diode 50 is used to clamp the reset of peak charge circuit 44 to one diode drop below the ground voltage of comparator 24. This sets a fixed reference point from which to charge the circuit during each cycle.

The peak value of the charge circuit 44 is rectified via diode 52 and filtered by capacitor 54 to an average value. Resistor 56 is used to discharge capacitor 54 so its peak value on a cycle by cycle basis can be maintained. This peak charged value is presented to the positive input 32 of the comparator 24 and sets the point at which the comparator state will change from a high to a low and shutoff the switch or FET 18.

Figure 5:
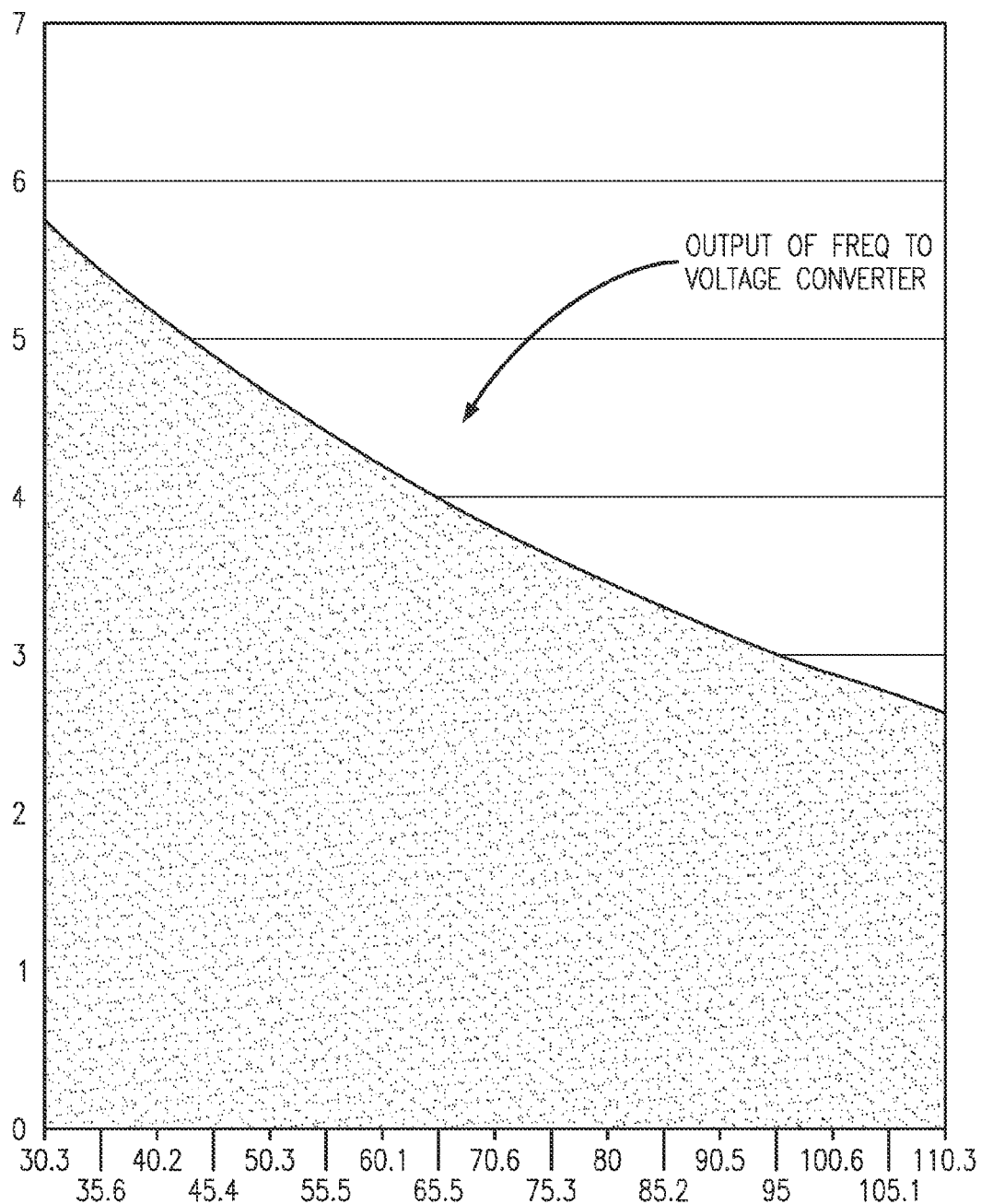
FIG. 5 is a drawing showing the typical output voltage vs. frequency of the converter for the Frequency to voltage circuit.

Since the negative input 32 of the comparator 24 is driven by a fixed DC reference that is derived each time the circuit is forward biased, the positive voltage will rise above the negative voltage at a time derived by the frequency of the converter. The relationship of this time-derived shutdown can be seen in FIG. 5.

The capacitor 64 shown between the output and ground of the DC to DC converter 10 functions to additionally filter the output voltage of the converter. Diode 20 and resistor 62 provide a nominal bias to the gate 26 of the FET 18.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical. It is intended that the claims cover all such modifications and alternative embodiments.

The invention claimed is:

1. A synchronous DC to DC converter circuit for converting an input DC voltage to an output DC voltage, the synchronous DC to DC converter circuit comprising:
    a two-stage DC input source for supplying DC input voltage, a first stage configured to supply high current for regulation to an electrical load, a second stage electromagnetically coupled to the first stage and configured to supply low current for FET bias and logic circuits;
    a control FET having a source, drain and gate, the gate functioning to control a flow of power from the drain to the source, wherein the source is connected to the electrical load;
    a comparator having positive and negative inputs and an output, wherein the output provides an alternating input control signal to the gate of the FET;
    means for providing a reference voltage to the negative input of the comparator;
    a voltage reset circuit for resetting the negative input of the comparator comprising a resistor and diode coupled to the second stage of the two-stage DC input source and the negative input of the comparator, wherein the voltage reset circuit resets the voltage on the negative input of the comparator each time a second stage voltage reverses direction;
    means for providing a peak charge voltage to the positive input of the comparator; and
    means for providing a bias current to the drain on the FET.

2. The synchronous DC to DC converter circuit of claim 1, wherein the two-stage DC input source comprises a transformer having a two stage secondary comprising a high power winding and a low power winding.

3. The synchronous DC to DC converter circuit of claim 2, wherein the low power winding is stacked on top of the high power winding and supplies low current for logic circuits to control the FET.

4. The synchronous DC to DC converter circuit of claim 3, wherein the means for providing a bias current to the drain of the FET is a diode and capacitor connected in series between the low power winding and the drain of the FET, whereby the diode and capacitor provide rectification and filtration, respectively, for the bias current.

5. The synchronous DC to DC converter circuit of claim 3, wherein the means for providing a peak charge voltage is a function of a RC time constant of a resister and capacitor connected between the low power winding and the positive input of the comparator.

6. The synchronous DC to DC converter circuit of claim 5, wherein a second resistor is used to discharge a second capacitor whereby the second capacitor's peak value can be maintained on a cycle by cycle basis.

7. The synchronous DC to DC converter circuit of claim 1, further comprising a capacitor across the source of the FET and ground for further filtration of an output signal.

8. A synchronous DC to DC converter circuit for converting an input DC voltage to an output DC voltage, the synchronous DC to DC converter circuit comprising:
   a transformer having a two stage secondary comprising a high power winding and a low power winding;
   a control FET having a source, drain and gate, the gate functioning to control a flow of power from the drain to the source, the source being connected to an electrical load;
   a comparator having positive and negative inputs and an output, the output serving to provide an alternating input control signal to the gate of the FET;
   a reference voltage circuit for providing reference voltage to the negative input of the comparator, the reference voltage circuit comprising a diode and resistor in series, connected between the low power winding and the negative input of the comparator;
   a voltage reset circuit for resetting the negative input of the comparator comprising a resistor and diode coupled to the low power winding and the negative input of the comparator, wherein the voltage reset circuit resets the voltage on the negative input of the comparator each time a transformer voltage reverses direction;
   a peak charge voltage circuit for providing a peak charge voltage on the positive input of the comparator, wherein the peak charge voltage is a function of a RC time constant of a resister and capacitor in series between the low power winding of the transformer and the positive input of the comparator; and
   a bias current circuit for providing bias current to the drain of the FET, the bias current circuit including a diode and capacitor connected in series between the low power winding and the drain of the FET, wherein the diode and capacitor provide rectification and filtration for the bias current.

9. The synchronous DC to DC converter circuit of claim 8, wherein the high power winding supplies high current for regulation of power to the load.

10. The synchronous DC to DC converter circuit of claim 8, wherein the low power winding is stacked on top of the high power winding and supplies low current to the logic circuits to control the FET.

11. The synchronous DC to DC converter circuit of claim 8, further comprising a capacitor across the source of the FET and ground for further filtration of an output signal.

12. A synchronous DC to DC converter circuit for converting an input DC voltage to an output DC voltage, the synchronous DC to DC converter circuit comprising:
   a transformer having a two stage secondary, the two stage secondary comprising a high power winding and a low power winding; wherein the high power winding provides high current for regulation to an electrical load, and further wherein the low power winding is stacked on top of the high power winding and supplies low current for logic circuit control;
   a first control switch functioning to control a flow of power from the high power winding of the transformer to the electrical load;
   a comparator providing an alternating input control signal to the first control switch;
   means for providing a reference voltage to the comparator;
   a voltage reset circuit for resetting the negative input of the comparator comprising a resistor and diode coupled to the low power winding and the negative input of the comparator, wherein the voltage reset circuit resets the voltage on the negative input of the comparator each time a transformer voltage reverses direction;
   means for providing a peak charge voltage to the comparator; and
   means for providing a bias current to the first control switch.

13. The synchronous DC to DC converter circuit of claim 12, wherein the first control switch is a FET having a source, drain and gate, the gate functioning to control the flow of power from the drain to the source.

14. The synchronous DC to DC converter circuit of claim 13, wherein the comparator has positive and negative inputs and a switchable output, the output serving to provide an alternating input control signal to the gate of the FET.

15. The synchronous DC to DC converter circuit of claim 14, wherein the means for providing bias current to the drain of the FET is a diode and capacitor connected in series between the low power winding and the drain of the FET, wherein the diode and capacitor provide rectification and filtration for the bias current.

16. The synchronous DC to DC converter circuit of claim 14, wherein the means for providing a peak charge voltage is a function of a RC time constant of a resister and capacitor connected between the low power winding and the positive input of the comparator.

17. The synchronous DC to DC converter circuit of claim 16, wherein a second resistor is used to discharge a second capacitor to maintain the second capacitor's peak value on a cycle by cycle basis.

18. The synchronous DC to DC converter circuit of claim 14, further comprising a capacitor across the source of the FET and ground for additional filtration of an output signal.

* * * * *